United States Patent
Lavallee

(10) Patent No.: US 12,488,784 B2
(45) Date of Patent: Dec. 2, 2025

(54) SYSTEM AND METHOD FOR ADAPTING NATURAL LANGUAGE UNDERSTANDING (NLU) ENGINES OPTIMIZED ON TEXT TO AUDIO INPUT

(71) Applicant: Microsoft Technology Licensing, LLC, Redmond, WA (US)

(72) Inventor: Jean-Francois Lavallee, Quebec (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 17/897,308

(22) Filed: Aug. 29, 2022

(65) Prior Publication Data

US 2024/0071368 A1   Feb. 29, 2024

(51) Int. Cl.
G10L 15/187 (2013.01)
G06F 40/242 (2020.01)
G10L 15/02 (2006.01)
G10L 15/06 (2013.01)

(52) U.S. Cl.
CPC .......... *G10L 15/063* (2013.01); *G06F 40/242* (2020.01); *G10L 15/02* (2013.01); *G10L 15/187* (2013.01); *G10L 2015/025* (2013.01)

(58) Field of Classification Search
CPC ..... G10L 15/063; G10L 15/02; G10L 15/187; G10L 2015/025; G06F 40/242
USPC ........................................................ 704/243
See application file for complete search history.

(56) References Cited

U.S. PATENT DOCUMENTS

| | | | | |
|---|---|---|---|---|
| 11,080,336 | B2* | 8/2021 | Van Dusen | G06Q 50/01 |
| 2009/0068625 | A1* | 3/2009 | Petro | G09B 17/00 |
| | | | | 434/167 |
| 2017/0221475 | A1* | 8/2017 | Bruguier | G10L 15/065 |
| 2019/0096390 | A1* | 3/2019 | Kurata | G10L 15/063 |
| 2020/0175961 | A1* | 6/2020 | Thomson | G10L 15/28 |
| 2021/0151042 | A1* | 5/2021 | Park | G10L 15/187 |

FOREIGN PATENT DOCUMENTS

| | | | | |
|---|---|---|---|---|
| WO | WO-2021216299 A1 * | 10/2021 | | G06N 3/045 |
| WO | WO-2024178262 A1 * | 8/2024 | | G06F 40/44 |

OTHER PUBLICATIONS

N. T. Rudrappa and M. V. Reddy, "Using Machine Learning for Speech Extraction and Translation: HiTEK Languages, " 2022 9th International Conference on Computing for Sustainable Global Development (INDIACom), New Delhi, India, 2022, pp. 267-271, doi: 10.23919/INDIACom54597.2022.9763300. keywords: {Dict (Year: 2022).*

(Continued)

*Primary Examiner* — Bharatkumar S Shah
(74) *Attorney, Agent, or Firm* — Workman Nydegger

(57) ABSTRACT

A method, computer program product, and computing system for generating a plurality of potential vocalizations of a plurality of text samples. A plurality of phonemes associated with the plurality of potential vocalizations are identified. A plurality of phonetically-related text portions are generated based upon, at least in part, the plurality of phonemes. A natural language understanding (NLU) engine is trained using the plurality of phonetically-related text portions.

12 Claims, 4 Drawing Sheets

(56) References Cited

OTHER PUBLICATIONS

D. Govind, R. Vishnu and D. Pravena, "Improved method for epoch estimation in telephonic speech signals using zero frequency filtering," 2015 IEEE International Conference on Signal and Image Processing Applications (ICSIPA), Kuala Lumpur, Malaysia, 2015, pp. 11-15, doi: 10.1109/ICSIPA.2015.7412155. (Year: 2015).*

K. W. Gamage, V. Sethu and E. Ambikairajah, "Modeling variable length phoneme sequences—A step towards linguistic information for speech emotion recognition in wider world," 2017 Seventh International Conference on Affective Computing and Intelligent Interaction (ACII), San Antonio, TX, USA, 2017, (Year: 2017).*

* cited by examiner

SYSTEM AND METHOD FOR ADAPTING NATURAL LANGUAGE UNDERSTANDING (NLU) ENGINES OPTIMIZED ON TEXT TO AUDIO INPUT

BACKGROUND

Natural language understanding (NLU) is a field of artificial intelligence that uses software or "engines" to understand input in the form of sentences using text or speech. Conventionally, NLU engines are trained on clean text data that do not represent what is experienced in deployment, such as for an audio application. As such, there is the potential for misalignment in the nature of representation of words (e.g., "2" versus "two"), grammatical conformity, speech disfluencies, automated speech recognition (ASR) errors, and vocabulary differences. As such, semantically equivalent representations from different modalities (i.e., text input or audio input) produce different NLU results.

BRIEF DESCRIPTION OF THE DRAWINGS

Like reference symbols in the various drawings indicate like elements.

DETAILED DESCRIPTION OF THE PREFERRED EMBODIMENTS

Figure 1:
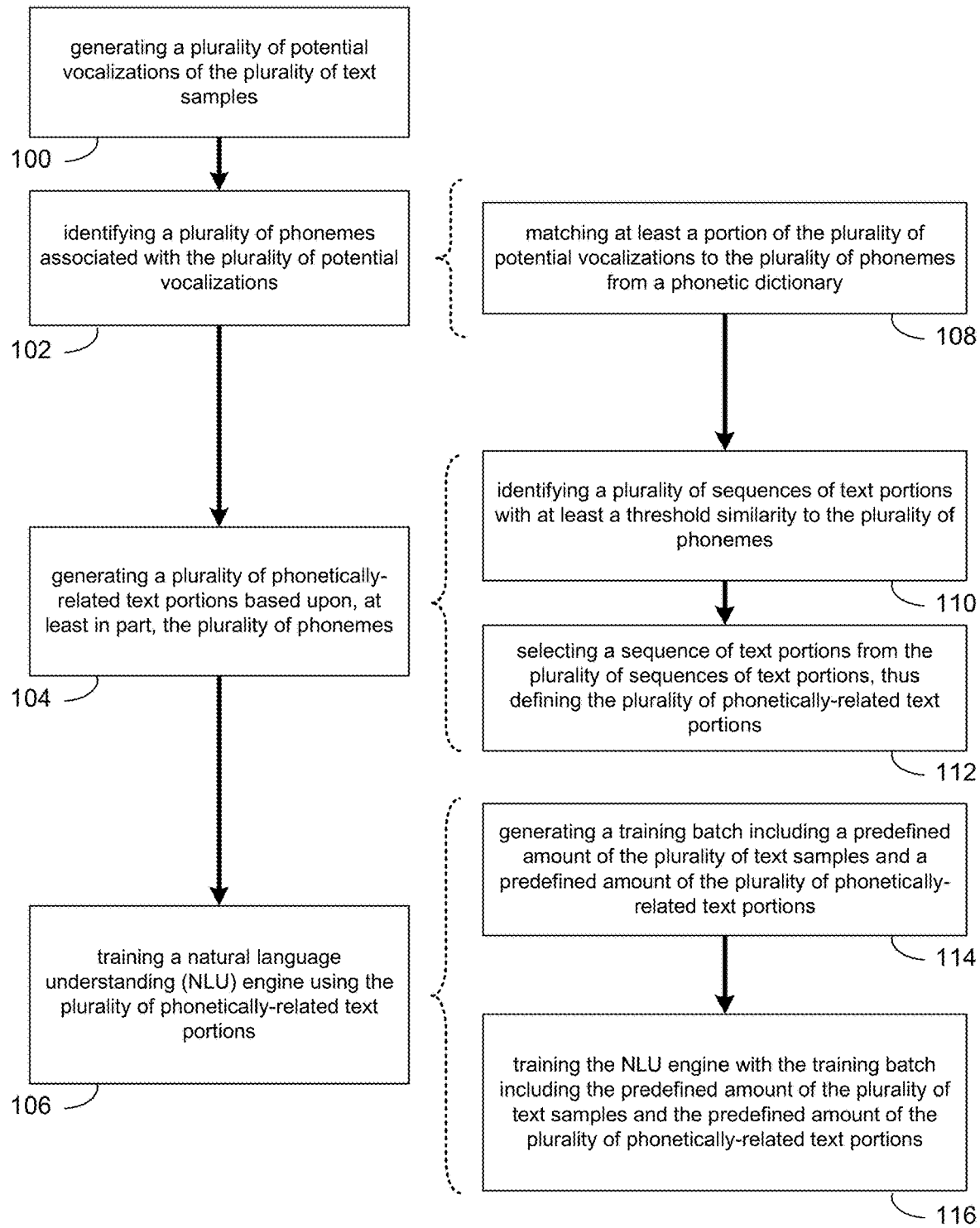
FIG. 1 is a flow chart of one implementation of a NLU training process.

As discussed above, NLU engines are generally trained on clean text data that may not represent what is experienced in deployment, such as for an audio application. As such, there is a risk of misalignment between audio or phonetic-based representations of words and text-based representations of words. This results in degraded NLU performance where the NLU engine is less accurate in the automated understanding of audio-based input (even when converted to text) as the audio-based input may be noisy compared to the text training data.

As will be discussed in greater detail below, implementations of the present disclosure provide a technical solution necessarily rooted in computing technology to provide phonetic data augmentation to enhance the accuracy of NLU engines used in audio-based applications. Specifically, implementations of the present disclosure may generate a plurality of phonetically-related text portions from a plurality of text samples and train the NLU engine using the plurality of phonetically-related text portions. A phonetically-related text portion is text that is phonetically similar (i.e., has a similar sound or similar phonemes when pronounced or spoken) to other text. For example, the word "Paris" and the word "perish" are textually dissimilar because of the different letters in each word but are phonetically similar because of the similar sounds each word makes when spoken. As such, an NLU engine that is trained on clean text-based training data may not correctly process phonetically-similar words when deployed with a speech processing system utilizing audio input data. For example, suppose an automated speech recognition system (ASR) receives the utterance "I would like to see Paris". In this example, suppose the ASR produces the phrase "I wood like two see perish". An NLU engine trained on clean text-based data alone may not be able to process the phrase to "understand" the intent of the user. However, by training the NLU engine with phonetically-similar text portions that have similar phonemes (e.g., "wood", "would", "too", "two", "to", "perish", "Paris"), the NLU engine is more robust against inaccurate speech processing from audio input data.

The details of one or more implementations are set forth in the accompanying drawings and the description below. Other features and advantages will become apparent from the description, the drawings, and the claims.

The NLU Training Process:

Referring to FIGS. 1-4, NLU training process 10 generates 100 a plurality of potential vocalizations of a plurality of text samples. A plurality of phonemes associated with the plurality of potential vocalizations are identified 102. A plurality of phonetically-related text portions are generated 104 based upon, at least in part, the plurality of phonemes. A natural language understanding (NLU) engine is trained 106 using the plurality of phonetically-related text portions.

As will be discussed in greater below, implementations of the present disclosure allow for the adapting of a NLU engine that is optimized or trained on text samples. As discussed above, NLU engines are usually trained using text samples as text-based samples are easier to obtain. However, because text samples are often "clean" (i.e., with little to no noise that are present in audio samples), NLU engines that are optimized with text training data suffer performance degradation when deployed in audio environments (e.g., NLU engine paired with an ASR system). Accordingly, NLU training process 10 generates phonetically-related text portions from the training text to train the NLU engine to account for distinctions between text and audio. In this manner, an NLU engine trained with phonetically-related text may be more robust to audio processing issues (e.g., those experienced by ASR systems) without requiring audio-based training data. For example, suppose an ASR system receives a speech signal (e.g., "I knead the dough for ten minutes") and generates the text-based phrase "I need the doe for pen minutes". An NLU engine trained with phonetically-related text data (e.g., text that sounds similar or has similar phonemes) as described below is able to address these ASR errors by mapping "knead" to "need", "doe" to "dough", and "pen" to "ten" as these text portions are not always semantically similar.

As discussed above, natural language understanding (NLU) represents a field of artificial intelligence that "understands" input in the form of sentences using text, speech, images, and/or video. An NLU engine is trained with text or audio samples that "teach" the NLU engine to understand the intent of the input and the entities recognized in the input. For example, NLU engines typically rely on encoder and decoder systems trained to encode input words into a machine-interpretable representation and then decode the representation of the understanding of the input into a human-interpretable representation (i.e., intent and entity's name positioned in a sentence).

In some implementations, NLU training process 10 generates 104 a plurality of phonetically-related text portions from a plurality of text samples. A phonetically-related text portion is text that is phonetically similar (i.e., has a similar sound when spoken) to the text samples from the training data. The plurality of text samples includes the text-based training data available to an NLU engine. In some implementations, the plurality of text samples include portions of reviewed transcriptions, portions of various corpuses, and/or other text-based information. As discussed above, the plurality of text samples is usually clean as they represent text data as opposed to "raw" text data such as the text data from an ASR system. In some implementations, the plurality of text samples may provide limited coverage compared to the text generated in audio applications (e.g., by an ASR system). For example, suppose the text samples include text from several medical transcriptions (e.g., transcriptions of encounter information between a medical professional and a patient). In this example, the text samples provide limited applicability when used with an ASR system or other speech processing system in non-medical environments.

Figure 2:
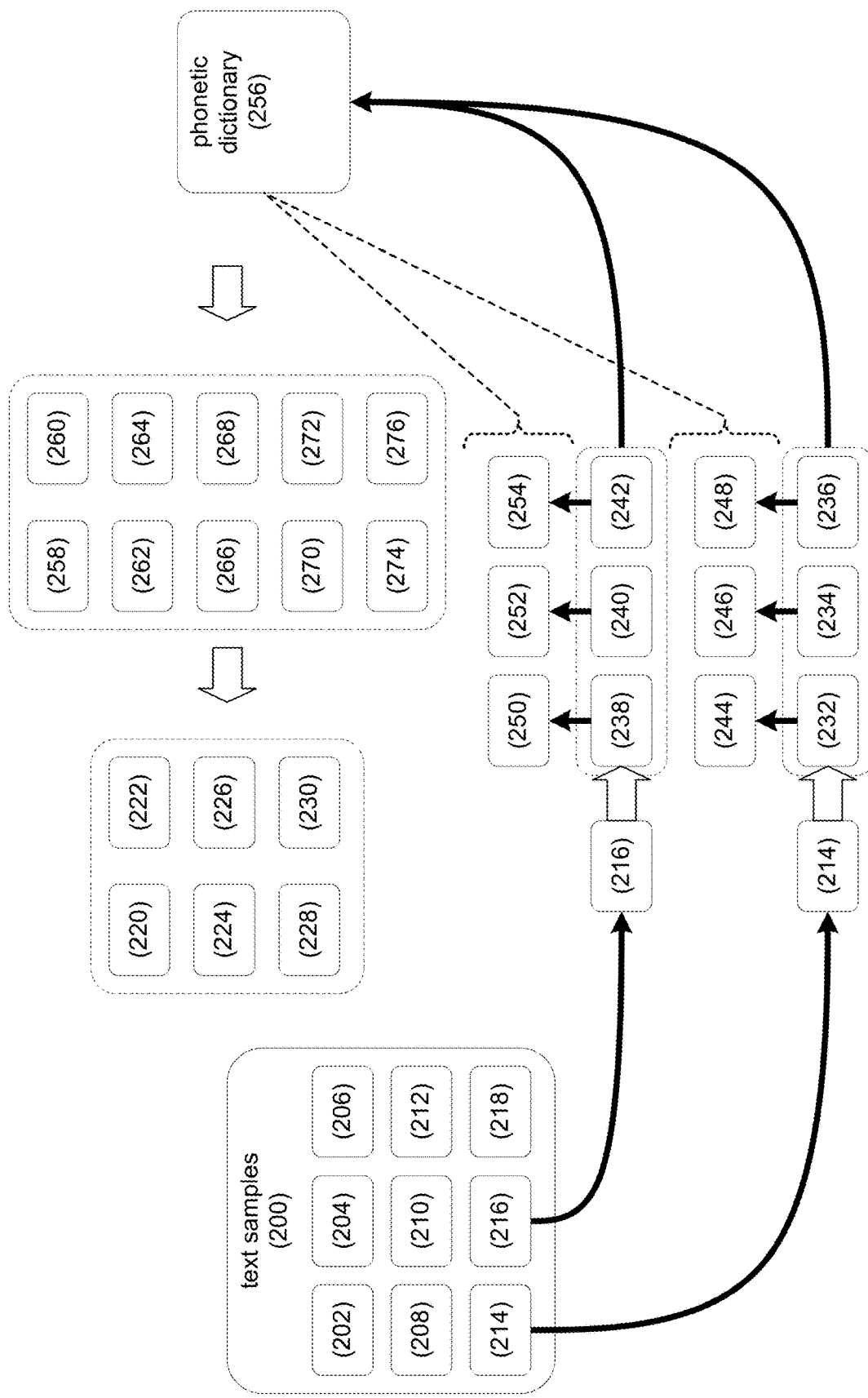
FIGS. 2-3 are diagrammatic views of the NLU training process of FIG. 1.

Referring also to FIG. 2, a plurality of text samples (e.g., text samples 200 including text portions 202, 204, 206, 208, 210, 212, 214, 216, 218) are used to generate a plurality of phonetically-related text portions (e.g., phonetically-related text portions 220, 222, 224, 226, 228, 230). Plurality of text samples 200 may be stored in a centralized database, in various databases forming a distributed database, and/or in any other storage configuration within the scope of the present disclosure.

In some implementations, NLU training process 10 generates 100 a plurality of potential vocalizations of the plurality of text samples. As discussed above, an NLU engine may include a machine learning model that is configured to process input text and/or speech to generate an output description or context of the input. As discussed above, a machine learning model may be "fine-tuned" to perform specific NLU tasks by being trained with specific training data over various epochs or training cycles. In such examples, NLU training process 10 may generate phonetically-related text portions and train the NLU engine with these phonetically-related text portions at each epoch. However, it will be appreciated that NLU training process 10 may generate phonetically-related text portions and train 102 the NLU engine with these phonetically-related text portions at any interval within the scope of the present disclosure.

A potential vocalization is a vocal token or representation of how a word or text portion sounds. In one example, NLU training process 10 generates 100 the plurality of potential vocalizations using a text-to-speech tokenizer that converts input text into a token representing the speech content of the input text. As shown in the example of FIG. 2, NLU training process 10 generates 104 a plurality of potential vocalizations (e.g., potential vocalizations 232, 234, 236, 238, 240, 242) from the plurality of text samples (e.g., text portions 214, 216).

In some implementations, the plurality of potential vocalizations forms a "lattice", matrix, or vector of vocal tokens for a given text sample. For example, suppose that text portion 214 represents "2 m" meaning "two meters". In this example, potential vocalizations 232, 234, 236 include "two", "m"| "meters". In another example, text portion 214 represents "order 2 pears" meaning a command to "order two pears". In this example, potential vocalizations 232, 234, 236 include "order", "two", "peers". In yet another example, text portion 214 represents "one win" and potential vocalizations 232, 234, 236 include "won", "1", "wind".

In some implementations, NLU training process 10 identifies 102 a plurality of phonemes associated with the plurality of potential vocalizations. A phoneme is a perceptually distinct unit of sound in a specified language that distinguishes one word from another. In some implementations, identifying 102 the plurality of phonemes associated with the plurality of potential vocalizations includes matching 106 at least a portion of the plurality of potential vocalizations to a plurality of phonemes from a phonetic dictionary. A phonetic dictionary is a collection of phonemes for consonants and vowels in a particular language. An example of a phonetic dictionary is the International Phonetic Alphabet (IPA). Referring again to FIG. 2, NLU training process 10 matches 106 at least a portion of the plurality of potential vocalizations (e.g., potential vocalizations 244, 246, 248, 250, 252, 254) to a plurality of phonemes (e.g., phonemes 232, 234, 236, 238, 240, 242) from a phonetic dictionary (e.g., phonetic dictionary 256). Returning to the above example, potential vocalizations 232, 234, 236 (e.g., [["two"], ["m"|"meters"]]) for text portion 214 matches 106 phonemes 244, 246, 248 (e.g., [[t, 'u],['E,m|m, 'I,t,@',z]]) from phonetic dictionary 256.

In some implementations, generating 104 the plurality of phonetically-related text portions includes identifying 108 a plurality of sequences of text portions with at least a threshold similarity to the plurality of phonemes. For example, NLU training process 10 may identify 108, for each sequence of phonemes, a sequence of words or text portions that are phonetically similar to the plurality of phonemes. The threshold similarity may be user-defined, a default value, or an automatically defined value for identifying phonetically-similar sequences of words. Returning to the above example, for each of the plurality of phonemes (e.g., [[t, 'u],['E,m|m,'I,t,@',z]]), a plurality of sequences of text portions (e.g., [[two],[too], . . . ],[[m],[aim],[me, their], [meters], . . . ]) are identified 108 with at least the threshold similarity to the plurality of phonemes. As shown in the example of FIG. 2, for each of phonemes 232, 234, 236, 238, 240, 242, NLU training process 10 identifies 108 a plurality of sequences of text portions (e.g., sequences of text portions 258, 260, 262, 264, 266, 268, 270, 272, 274, 276) that have at least a threshold similarity to the plurality of phonemes.

In some implementations, generating 104 the plurality of phonetically-related text portions includes selecting 110 a sequence of text portions from the plurality of sequences of text portions, thus defining the plurality of phonetically-related text portions. For example, NLU training process 10 allows for any amount of the plurality of phonetically-related text portions to be integrated into the training data. In one example, NLU training process 10 selects a sequence of text portions for inclusion in the training data. Specifically, the sequence of text portions is chosen randomly. In some implementations, the selected sequence covers all of the original text samples and has the same order. In this example, if the selected sequence is already present in the training data or is identical to a previously selected sequence, NLU training process 10 selects another sequence of text portions from the plurality of sequences of text portions.

Figure 3:
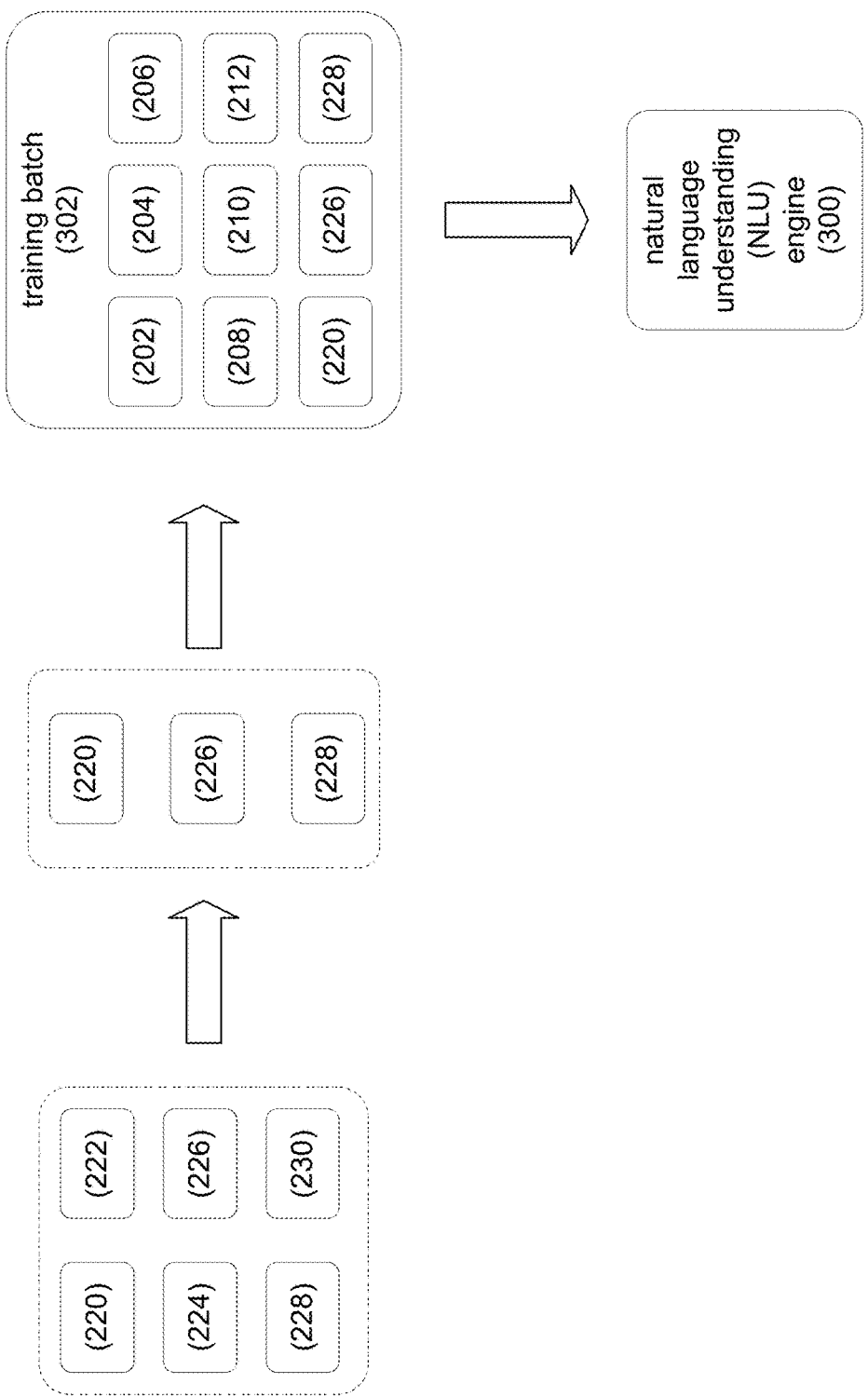

Referring also to the example of FIG. 3, NLU training process 10 selects 110 a sequence of text portions (e.g., phonetically-related text portions 220, 222, 224, 226, 228, 230) from the plurality of sequences of text portions (e.g., sequences of text portions 258, 260, 262, 264, 266, 268, 270, 272, 274, 276) for inclusion in the training data. Specifically in this example, the selection of sequences of text portions (e.g., phonetically-related text portions 220, 222, 224, 226, 228, 230) is random.

In some implementations, NLU training process 10 trains 106 a natural language understanding (NLU) engine using the plurality of phonetically-related text portions. For example and as discussed above, conventional NLU engine training includes using clean text as training data that does not represent what an NLU engine processes as input when deployed in audio-based tasks. For example, the distinctions in pronunciation of particular words or sequences of words may alter the NLU engine's estimation of an intent associated with particular input speech. As such, NLU training process 10 may train 106 a NLU engine using the plurality of phonetically-related text portions to help the NLU engine account for the distinctions between clean text training data and actual audio input data.

In some implementations, training 106 the NLU engine using the plurality of phonetically-related text portions includes generating 112 a training batch including a predefined amount of the plurality of text samples and a predefined amount of the plurality of phonetically-related text portions. For example, to avoid increasing the total number of training iterations or batch sizes associated with training an NLU engine, NLU training process 10 selects a portion (e.g., a sequence of text portions) from the plurality of sequences of text portions for inclusion in the training data.

In one example, NLU training process 10 selects a predefined amount of the plurality of text samples (e.g., original text samples) and a predefined amount of phonetically-related text portions to define a training batch for the NLU engine. The predefined amount of text samples and/or the predefined amount of phonetically-related text portions may be user-defined, a default value, or a value defined automatically by NLU training process 10 in response to various metrics (e.g., time required to train NLU engine, type of application for the NLU engine, etc.). In this manner, the predefined amount of text samples and/or the predefined amount of phonetically-related text portions may be defined for particular NLU engines or applications within the scope of the present disclosure.

In some implementations, training 106 the NLU engine using the plurality of phonetically-related text portions includes training 114 the NLU engine with the training batch including the predefined amount of the plurality of text samples and the predefined amount of the plurality of phonetically-related text portions. For example, and as discussed above, NLU training process 10 augments original text training data with phonetically-related sequences of text.

Referring again to the example of FIG. 3, NLU training process 10 trains 114 the NLU engine (e.g., NLU engine 300) with the training batch (e.g., training batch 302) including the predefined amount of original text samples (e.g., text samples 202, 204, 206, 208, 210, 212) and the predefined amount of phonetically-related text portions (e.g., phonetically-related text portions 220, 226, 228). While the above example includes e.g., three phonetically-related text portions and e.g., six original text samples, it will be appreciated that this is for example purposes only and that any number of phonetically-related text portions and/or original text samples may be used to train the NLU engine within the scope of the present disclosure.

In one example, the predefined amount of phonetically-related text portions is less than or equal to fifty percent of the total amount of training data used to train the NLU engine. In another example, the predefined amount of phonetically-related text portions is less than or equal to forty percent of the training batch. In yet another example, the predefined amount of phonetically-related text portions is less than or equal to sixty percent of the training batch.

Figure 4:
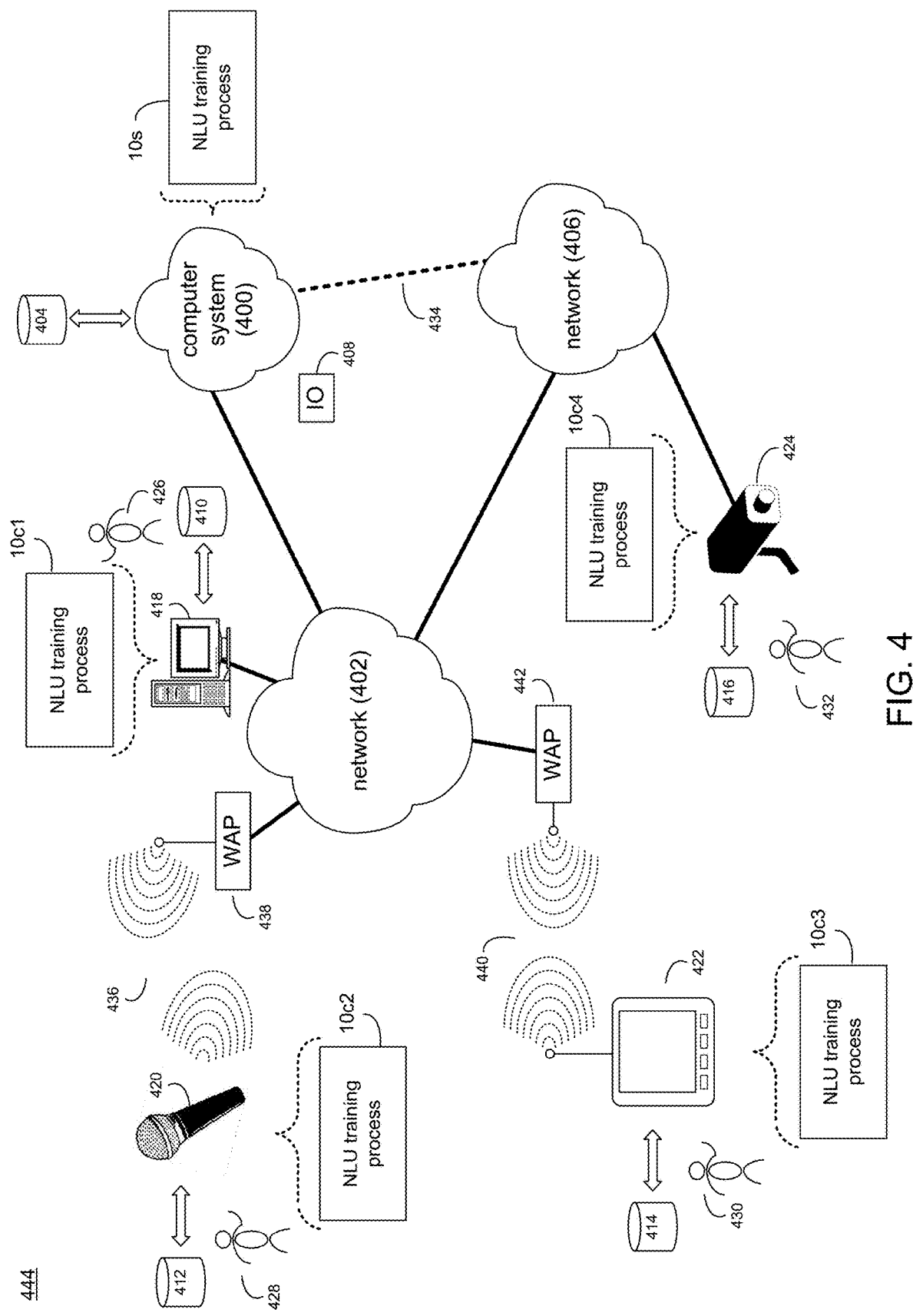
FIG. 4 is a diagrammatic view of a computer system and the NLU training process coupled to a distributed computing network.

System Overview:

Referring to FIG. 4, there is shown NLU training process 10. NLU training process 10 may be implemented as a server-side process, a client-side process, or a hybrid server-side/client-side process. For example, NLU training process 10 may be implemented as a purely server-side process via NLU training process 10s. Alternatively, NLU training process 10 may be implemented as a purely client-side process via one or more of NLU training process 10c1, NLU training process 10c2, NLU training process 10c3, and NLU training process 10c4. Alternatively still, NLU training process 10 may be implemented as a hybrid server-side/client-side process via NLU training process 10s in combination with one or more of NLU training process 10c1, NLU training process 10c2, NLU training process 10c3, and NLU training process 10c4.

Accordingly, NLU training process 10 as used in this disclosure may include any combination of NLU training process 10s, NLU training process 10c1, NLU training process 10c2, NLU training process 10c3, and NLU training process 10c4.

NLU training process 10s may be a server application and may reside on and may be executed by a computer system 400, which may be connected to network 402 (e.g., the Internet or a local area network). Computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 400 may execute one or more operating systems.

The instruction sets and subroutines of NLU training process 10s, which may be stored on storage device 404 coupled to computer system 400, may be executed by one or more processors (not shown) and one or more memory architectures (not shown) included within computer system 400. Examples of storage device 404 may include but are not limited to: a hard disk drive; a RAID device; a random access memory (RAM); a read-only memory (ROM); and all forms of flash memory storage devices.

Network 402 may be connected to one or more secondary networks (e.g., network 404), examples of which may include but are not limited to: a local area network; a wide area network; or an intranet, for example.

Various IO requests (e.g., IO request 408) may be sent from NLU training process 10s, NLU training process 10c1, NLU training process 10c2, NLU training process 10c3 and/or NLU training process 10c4 to computer system 400. Examples of IO request 20 may include but are not limited to data write requests (i.e., a request that content be written to computer system 400) and data read requests (i.e., a request that content be read from computer system 400).

The instruction sets and subroutines of NLU training process 10c1, NLU training process 10c2, NLU training process 10c3 and/or NLU training process 10c4, which may be stored on storage devices 410, 412, 414, 416 (respectively) coupled to client electronic devices 418, 420, 422, 424 (respectively), may be executed by one or more processors (not shown) and one or more memory architectures (not shown) incorporated into client electronic devices 418, 420, 422, 424 (respectively). Storage devices 410, 412, 414, 416 may include but are not limited to: hard disk drives; optical drives; RAID devices; random access memories (RAM); read-only memories (ROM), and all forms of flash memory storage devices. Examples of client electronic devices 418, 420, 422, 424 may include, but are not limited to, personal computing device 418 (e.g., a smart phone, a personal digital assistant, a laptop computer, a notebook computer, and a desktop computer), audio input device 420 (e.g., a handheld microphone, a lapel microphone, an embedded microphone (such as those embedded within eyeglasses, smart phones, tablet computers and/or watches) and an audio recording device), display device 422 (e.g., a tablet computer, a computer monitor, and a smart television), machine vision input device 424 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 426, 428, 430, 432 may access computer system 400 directly through network 402 or through secondary network 406. Further, computer system 400 may be connected to network 402 through secondary network 406, as illustrated with link line 432.

The various client electronic devices (e.g., client electronic devices 418, 420, 422, 424) may be directly or indirectly coupled to network 402 (or network 406). For example, personal computing device 418 is shown directly coupled to network 402 via a hardwired network connection. Further, machine vision input device 424 is shown directly coupled to network 406 via a hardwired network connection. Audio input device 422 is shown wirelessly coupled to network 402 via wireless communication channel 436 established between audio input device 420 and wireless access point (i.e., WAP) 438, which is shown directly coupled to network 402. WAP 436 may be, for example, an IEEE 802.11a, 802.11b, 802.11g, 802.11n, Wi-Fi, and/or Bluetooth™ device that is capable of establishing wireless communication channel 436 between audio input device 420 and WAP 438. Display device 422 is shown wirelessly coupled to network 402 via wireless communication channel 440 established between display device 422 and WAP 442, which is shown directly coupled to network 402.

The various client electronic devices (e.g., client electronic devices 418, 420, 422, 424) may each execute an operating system, wherein the combination of the various client electronic devices (e.g., client electronic devices 418, 420, 422, 424) and computer system 400 may form modular system 444.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    generating a plurality of potential vocalizations of a plurality of text samples, wherein generating the plurality of potential vocalizations includes processing the plurality of text samples using a text-to-speech tokenizer that converts each text sample into a token representing the speech content of the respective text sample;
    identifying a plurality of phonemes associated with the plurality of potential vocalizations, wherein identifying the plurality of phonemes associated with the plurality of potential vocalizations includes matching at least a portion of the plurality of potential vocalizations to the plurality of phonemes from a phonetic dictionary:
    generating a plurality of phonetically-related text portions based upon, at least in part, the plurality of phonemes, wherein generating the plurality of phonetically-related text portions includes:
        identifying a plurality of sequences of text portions with at least a threshold similarity to the plurality of phonemes; and
        selecting a sequence of text portions from the plurality of sequences of text portions that covers each of the plurality of text samples and is in a same order as the plurality of text samples, thus defining the plurality of phonetically-related text portions; and
    training a natural language understanding (NLU) engine using the plurality of phonetically-related text portions.

2. The computer-implemented method of claim 1, wherein the NLU engine is a machine learning model.

3. The computer-implemented method of claim 1, wherein training the NLU engine using the plurality of phonetically-related text portions includes generating a training batch including a predefined amount of the plurality of text samples and a predefined amount of the plurality of phonetically-related text portions.

4. The computer-implemented method of claim 3, wherein training the NLU engine using the plurality of phonetically-related text portions includes training the NLU engine with the training batch including the predefined amount of the plurality of text samples and the predefined amount of the plurality of phonetically-related text portions.

5. A computing system comprising: a memory; and
    a processor to generate a plurality of potential vocalizations of a plurality of text samples, wherein generating the plurality of potential vocalizations includes processing the plurality of text samples using a text-to-speech tokenizer that converts each text sample into a token representing the speech content of the respective text sample, to match at least a portion of the plurality of potential vocalizations to a plurality of phonemes from a phonetic dictionary, to generate a plurality of phonetically-related text portions based upon, at least in part, the plurality of phonemes, wherein generating the plurality of phonetically-related text portions includes: identifying a plurality of sequences of text portions with at least a threshold similarity to the plurality of phonemes, and selecting a sequence of text portions from the plurality of sequences of text portions that covers each of the plurality of text samples and is in a same order as the plurality of text samples, thus defining the plurality of phonetically-related text portions, and to train a natural language understanding (NLU) engine with a predefined amount of the plurality of text samples and a predefined amount of the plurality of phonetically-related text portions.

6. The computing system of claim 5, wherein the NLU engine is a machine learning model.

7. The computing system of claim 6, wherein generating the plurality of phonetically-related text portions includes generating the plurality of phonetically-related text portions at each epoch during fine-tuning of the NLU engine.

8. The computing system of claim 5, wherein training the NLU engine using the plurality of phonetically-related text portions includes generating a training batch including the predefined amount of the plurality of text samples and the predefined amount of the plurality of phonetically-related text portions.

9. The computing system of claim 8, wherein the predefined amount of the plurality of text samples is less than or equal to fifty percent of the training batch.

10. A computer program product residing on a hardware computer readable medium having a plurality of instructions stored thereon which, when executed by a processor, cause the processor to perform operations comprising:
    generating a plurality of potential vocalizations of a plurality of text samples, wherein generating the plurality of potential vocalizations includes processing the plurality of text samples using a text-to-speech tokenizer that converts each text sample into a token representing the speech content of the respective text sample;
    identifying a plurality of phonemes associated with the plurality of potential vocalizations, wherein identifying the plurality of phonemes associated with the plurality of potential vocalizations includes matching at least a portion of the plurality of potential vocalizations to the plurality of phonemes from a phonetic dictionary;
    generating a plurality of phonetically-related text portions based upon, at least in part, the plurality of phonemes, wherein generating the plurality of phonetically-related text portions includes:
        identifying a plurality of sequences of text portions with at least a threshold similarity to the plurality of phonemes; and
        selecting a sequence of text portions from the plurality of sequences of text portions that covers each of the plurality of text samples and is in a same order as the plurality of text samples, thus defining the plurality of phonetically-related text portions; and
    training a natural language understanding (NLU) engine using the plurality of phonetically-related text portions, wherein training the NLU engine using the plurality of phonetically-related text portions includes generating a training batch including a predefined amount of the plurality of text samples and a predefined amount of the plurality of phonetically-related text portions.

11. The computer program product of claim 10, wherein the NLU engine is a machine learning model.

12. The computer program product of claim 11, wherein generating the plurality of phonetically-related text portions includes generating the plurality of phonetically-related text portions at each epoch during fine-tuning of the NLU engine.

* * * * *